United States Patent [19]
Guyomard et al.

[11] Patent Number: 5,422,203
[45] Date of Patent: Jun. 6, 1995

[54] RAPID REVERSIBLE INTERCALATION OF LITHIUM INTO CARBON SECONDARY BATTERY ELECTRODES

[75] Inventors: Dominique Guyomard, Nantes, France; Jean-Marie Tarascon, Martinsville, N.J.

[73] Assignee: Bell Communications Research, Inc., Livingston, N.J.

[21] Appl. No.: 952,392

[22] Filed: Sep. 28, 1992

[51] Int. Cl.$^6$ ............................................. H01M 6/16
[52] U.S. Cl. ................................. 429/194; 429/197; 429/218
[58] Field of Search ......................... 429/194, 197, 218

[56] References Cited

U.S. PATENT DOCUMENTS

| | | | |
|---|---|---|---|
| 4,056,663 | 11/1977 | Schlaikjer | 429/197 |
| 4,957,833 | 9/1990 | Daifuku et al. | 429/197 |
| 5,028,500 | 7/1991 | Fong et al. | 429/194 |
| 5,053,297 | 10/1991 | Yamahisa et al. | 429/218 |
| 5,079,109 | 1/1992 | Takami et al. | 429/197 |
| 5,110,696 | 5/1992 | Shokoohi et al. | 429/218 |
| 5,153,082 | 10/1992 | Ogino et al. | 429/194 |
| 5,244,757 | 9/1993 | Takami et al. | 424/194 |

Primary Examiner—Prince Willis, Jr.
Assistant Examiner—M. Nuzzolillo
Attorney, Agent, or Firm—Leonard Charles Suchyta; Lionel N. White

[57] ABSTRACT

Irreversible loss of lithium during the initial discharge cycle of secondary batteries with carbon intercalation electrodes is substantially reduced by employing as the cell electrolyte a non-aqueous solution of $LiPF_6$ in a mixture of dimethylcarbonate and ethylene carbonate. By this means, in a secondary battery cell comprising, for example, a $Li_{1+x}Mn_2O_4$ positive electrode and a graphite negative electrode, up to about 90% of the theoretical level of lithium can be reversibly cycled at an exceptionally high rate of about C/1 (complete discharge in one hour).

7 Claims, 3 Drawing Sheets

RAPID REVERSIBLE INTERCALATION OF LITHIUM INTO CARBON SECONDARY BATTERY ELECTRODES

BACKGROUND OF THE INVENTION

This invention relates to secondary lithium intercalation batteries and, particularly, to such batteries which comprise a lithium ion source electrode and a carbon electrode. More particularly, the invention relates to the improvement in the reversible intercalation of lithium into carbon electrodes, notably graphite, at high cycling rates and with maintained cell capacity by means of the utilization of a unique class of non-aqueous electrolyte.

The ability of carbon, such as petroleum coke or graphite, to intercalate lithium ions into its structure has been known for some time. A more recent study of such intercalation from a metallic lithium source was reported by Fong et al. (R. Fong, U. Von Sacken, J. R. Dahn, *J. Electrochem. Soc.*, 137, 2009 (1990) and noted, in particular, that when combined with typical non-aqueous electrolyte compositions in a battery cell structure, the lithium/carbon combination encounters a significant initial inability of the carbon electrode to reversibly intercalate lithium ions. The Fong study attributed this irreversible loss of lithium to its assimilation in reactions resulting from the apparent passivation of the carbon electrode surface during the first discharge of the battery cell. Up to about 30% of the total initial capacity was seen to be lost in this irreversible reaction when using a petroleum coke electrode, while the loss of as much as 50% of the total initial capacity of lithium into a graphite electrode was observed. In otherwise desirable secondary cells utilizing safer lithium intercalation compounds as lithium source electrodes in lieu of the more highly reactive lithium metal, such a loss of lithium is disadvantageous, indeed, when one considers the limited store of lithium normally available in the lithiated intercalation positive electrode.

In our application, Ser. No. 07/871,855, filed 21 Apr. 1992, now U.S. Pat. No. 5,192,629, we described a non-aqueous electrolyte for a secondary battery having lithiated intercalation and carbon electrodes which resists destructive oxidation previously encountered during attempts to charge such a battery at the higher voltages necessary to take advantage of improved intercalation materials, such as $Li_{1+x}Mn_2O_4$ ($0 < x < 1$). We have now discovered that the irreversible loss of lithium on carbon during the first discharge of the secondary battery, which in the past has detracted from the utility of these carbon electrodes, can be significantly reduced by employing this electrolyte in such intercalation cells. We discovered, also, that use of this electrolyte maintains the high level capacity (Ah/g) of the cells even at increased cycle rates up to the range of about 2C (complete discharge in 30 minutes).

SUMMARY OF THE INVENTION

A vast improvement in the reversible intercalation of lithium from the source electrode of a lithium/carbon secondary battery into the carbon electrode is made possible by employing as the cell electrolyte a solution of $LiPF_6$, or mixtures of $LiPF_6$ with up to about equal mole parts of $LiBF_4$, in a mixture of between about 95 and 20 parts by weight of dimethylcarbonate (DMC) with between about 5 and 80 parts by weight of ethylene carbonate (EC). The previously experienced irreversible loss of up to about 50% of the lithium initially intercalated into a graphite electrode has been reduced to as little as about a 15% loss by this means. Furthermore, while not as notable, since the initial irreversibility is commonly less with such material, improvement is seen also in cells comprising petroleum coke electrodes.

Commercially available graphite having a particle size in the range of about 1 μm provides an electrode which exhibits excellent intercalation reversibility with the new electrolyte in a lithium cell over a range of about $\Delta x = 0.9$ in $Li_xC_6$, corresponding to a capacity of about 325 mAh/g of electrode graphite. This capacity remains substantially unchanged when the discharge current rate is increased from about C/15 (15 hr. full discharge) to about C/2 (2 hr. discharge). Even at cycling rates as high as C/1, a lithium/graphite cell comprising the new electrolyte maintains reversible intercalation of about 0.9 Li per $Li_xC_6$ (90% of theoretical) without significant loss in capacity.

A so-called "rocking-chair" cell comprising the new electrolyte and a positive electrode of lithiated intercalation compound, such as $Li_{1+x}Mn_2O_4$ ($0 < x < 1$), optimized to a ratio of 2.8 times the amount of negative electrode graphite increases cell capacity by about 22%, as compared to that previously attainable with a 2.1 ratio of the previously preferred low irreversibility petroleum coke carbon electrode. In addition, the lower intercalation voltage of lithium into graphite as compared with petroleum coke (0.15 V vs. 0.3 V) results in a higher output voltage of the graphite cell (3.85 V vs. 3.7 V) and provides an overall cell specific energy increase of about 28%.

BRIEF DESCRIPTION OF THE DRAWING

The present invention will be described with reference to the accompanying drawing of which.

DESCRIPTION OF THE INVENTION

Figure 1:
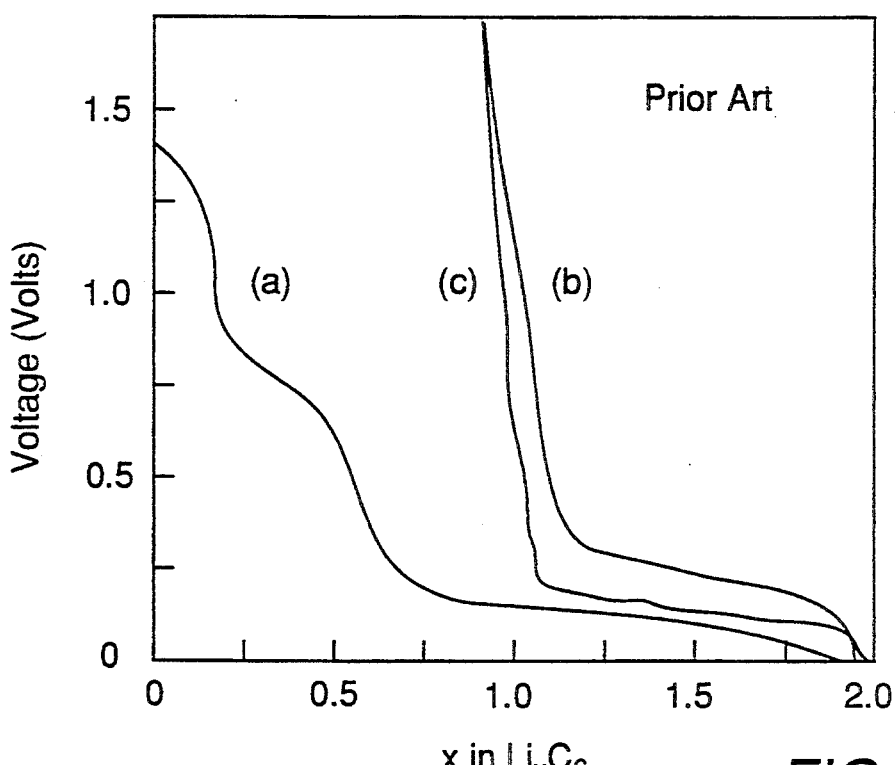
FIG. 1 depicts a plot of charging voltage against carbon electrode composition for a lithium/graphite cell comprising a prior art electrolyte.

As can be seen in FIG. 1 which presents data from the previously-noted Fong study, the initial discharge (shown at trace (a)) of a typical prior art lithium/graphite cell comprising as the electrolyte a solution of $LiAsF_6$ in a mixture of propylene carbonate and ethylene carbonate exhibits the assimilation of about one lithium atom at the graphite electrode before the onset of any reversible lithium intercalation, which is shown by the closely matching traces (b) and (c) which are representative of charge and discharge cycles, respectively. Thus, during the initial discharge cycle roughly one-half the lithium making its way to the graphite electrode is irreversibly taken up by passivation and other reactions and is unavailable for subsequent energy-yielding reversible cycling. Although this 50% loss of available lithium during the initial cycling is not of serious consequence in cells comprising an abundant lithium electrode source, in preferred, non-lithium-metal "rocking-chair" cells comprising intercalation electrode compounds, such as $Li_xMn_2O_4$ ($0<x<2$), no amount of the limited available lithium can be expended in this manner if such cells are to provide efficient operation. Further, the study has shown that with previously available electrolytes the charge/discharge cycling rate should be reduced to about C/40 in order to maintain respectable cell capacity.

Figure 2:
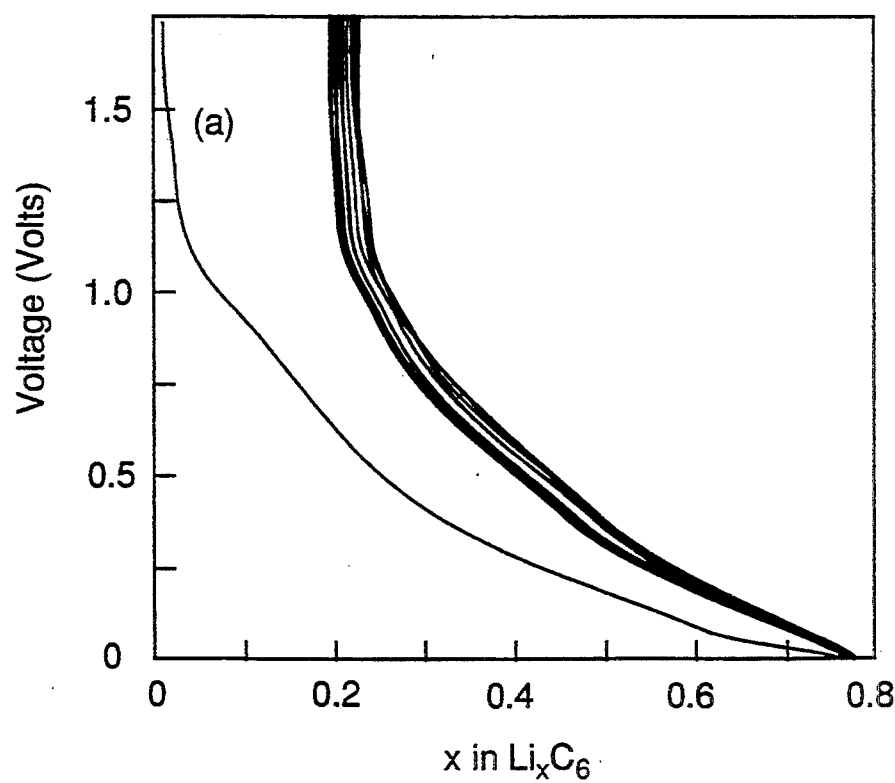
FIG. 2 depicts a plot of charging voltage against carbon electrode composition for a lithium/petroleum coke cell comprising the improved electrolyte according to the present invention.

Consistent with previous findings, the carbon electrode showing the least irreversibility in the Fong study was petroleum coke which initially lost about 29% of the transferred lithium at a C/12.5 cycling rate. Most commercially developing carbon electrode batteries are for this reason generally employing petroleum coke electrodes. The operation of this currently preferred electrode material is substantially improved by the use of our new LiPF$_6$/DMC/EC electrolyte as can be seen in FIG. 2 which depicts the intercalation of lithium into a petroleum coke electrode over a number of cycles at a C/15 rate. The disparity between the initial trace (a) and the remaining cycle traces is indicative of an electrode irreversibility which amounts to about 25%. This nearly 15% decrease in lithium loss substantially improves the utility of petroleum coke; however, there remains a basic drawback to its use, apparent in FIG. 2, namely the inherent limitation of this material to reversibly intercalate only up to about 0.5 lithium in $Li_xC_6$.

Figure 3:
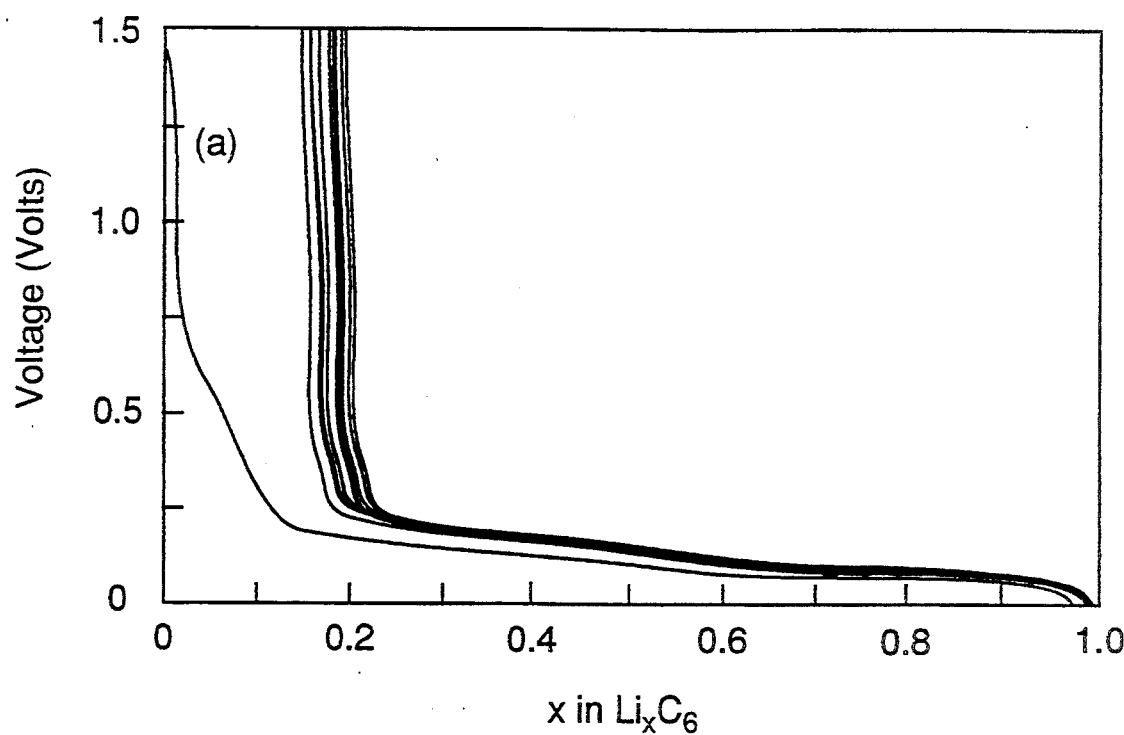
FIG. 3 depicts a plot of charging voltage against carbon electrode composition for a lithium/graphite cell comprising the improved electrolyte according to the present invention.

The greatest significance in the use of our electrolyte according to the present invention is seen in FIG. 3 which shows the results of recycling a lithium/graphite cell at a C/15 rate. The irreversibility represented in the offset of initial discharge trace (a) amounts to only about 15%, while the reversible intercalation of lithium spans nearly the whole of the theoretical range ($\Delta x=0.9$ in $Li_xC_6$). By means of this electrolyte, therefore, there is made available the full potential and range of advantages in graphite electrode cells not previously attainable due to the irreversibility arising in no small measure from the then known electrolyte compositions themselves.

Figure 4:
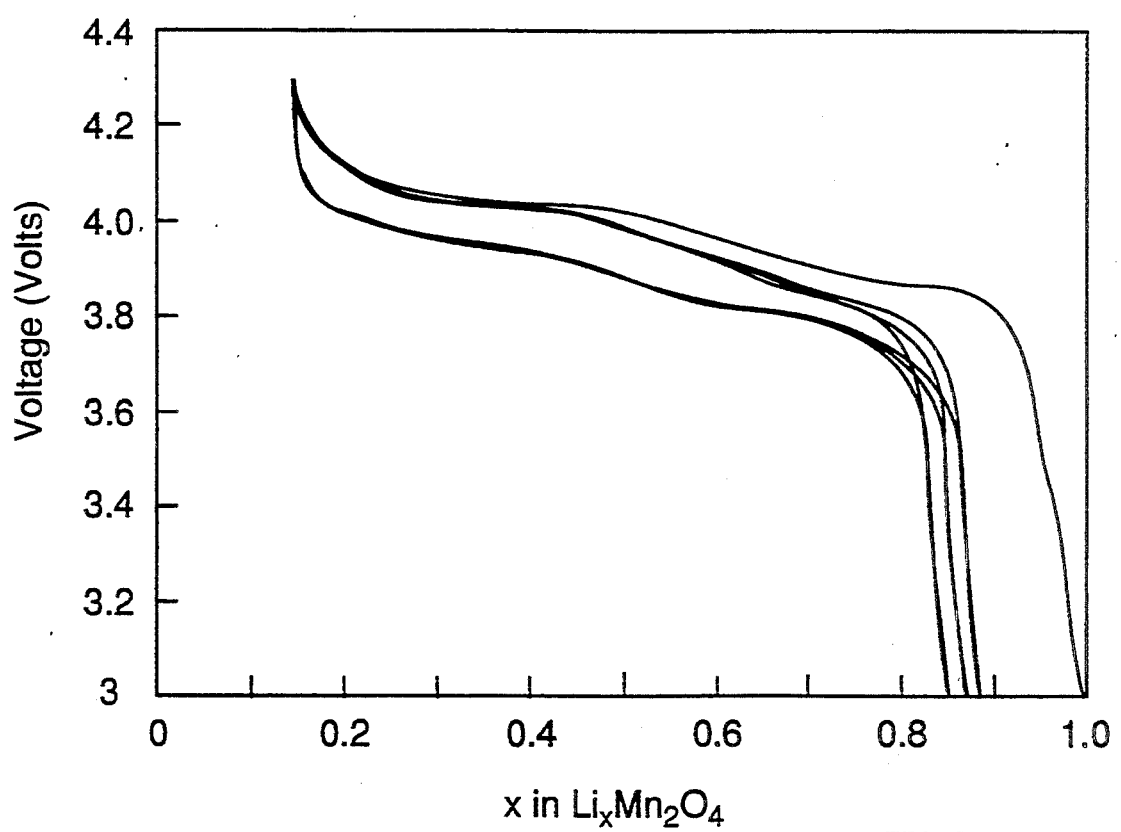
FIG. 4 depicts a plot of the charge/discharge voltage against lithium intercalation compound positive electrode composition during early cycles in a graphite electrode cell comprising the improved electrolyte according to the present invention.

Lowering the lithium loss on carbon by incorporation of the present electrolyte is particularly noteworthy in the lithium-metal-free "rocking-chair" cell comprising a graphite negative electrode. Performance over early cycles for such a cell with a positive electrode of $Li_xMn_2O_4$ ($0<x<1$) is shown in FIG. 4 where this simpler composition is seen to typically intercalate about 90% of theoretical. Not only does the DMC-based electrolyte significantly expand the capacity of the intercalated electrode cell, it further enables such cells to provide that capacity level over an extended range of cycling current rates from about 15 to 0.5 hours.

To examine the efficacy of the electrolyte over a range of component ratios, 0.5 to 2 molar solutions of LiBF$_6$, and mixtures of LiPF$_6$ with up to about equal mole parts of LiBF$_4$, were prepared in mixtures of 20 to 80% dimethylcarbonate (DMC) with ethylene carbonate (EC). Portions of these solutions were immobilized by imbibing into glass paper elements which were then disposed between and in contact with the lithium and graphite electrodes as the separators in typical Swagelock test cells. The graphite electrode was prepared by coating a copper substrate to a nitrogen-dried thickness of about 40 $\mu$m from a slurry of commercially-available 1$\mu$m particle size graphite containing about 5% binder, e.g. poly(vinylidene fluoride), in 2-methyl phthalate.

Figure 5:
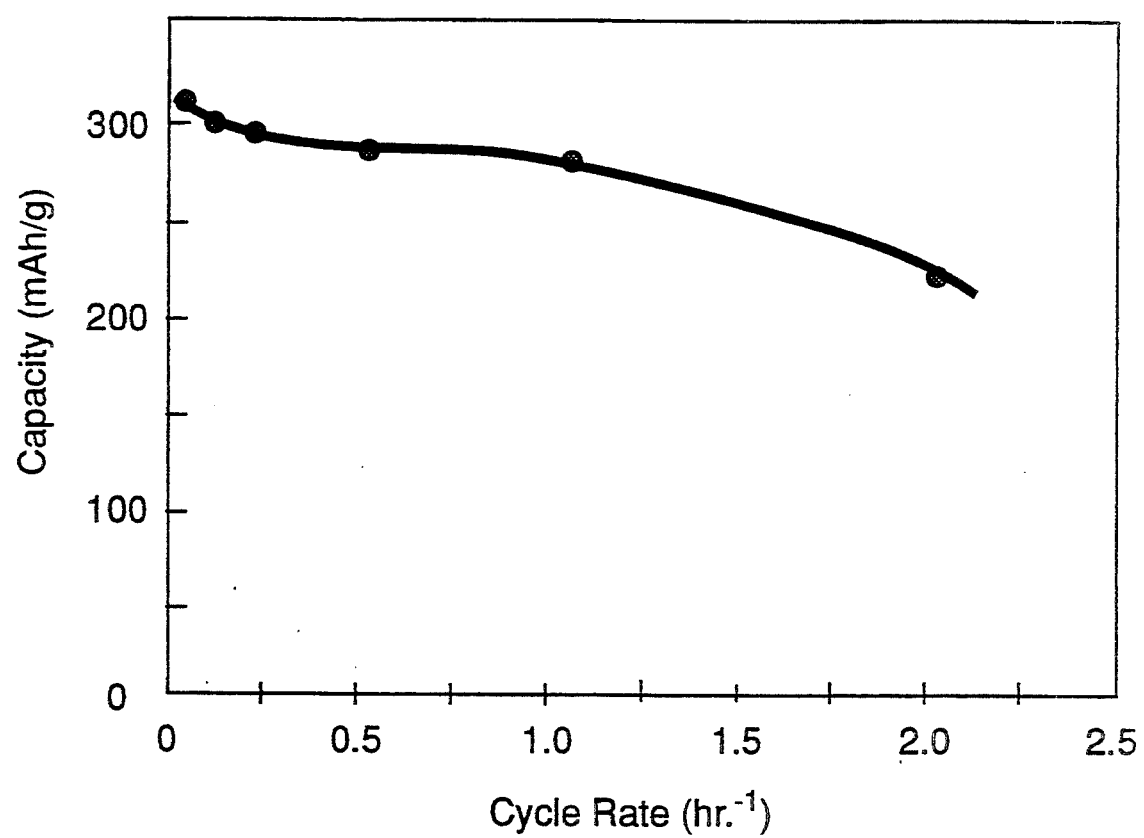
FIG. 5 depicts a plot of cell capacity against cycling current rate for a lithium/graphite cell comprising the improved electrolyte according to the present invention.

The resulting cells exhibited generally consistent behavior over the range of electrolyte compositions with not more than about 15% initial cycle irreversibility being apparent. The extent of reversible lithium intercalation remained at about 90% for the group of cells and upon cycling at average current rates of about 70 $\mu$A/cm$^2$, equivalent to a 15 hour discharge rate of C/15, the cells indicated a capacity of about 325 Ah/g of electrode graphite. A cell with optimum electrolyte composition of about 1M LiPF$_6$ in 67:33 DMC:EC when cycled over a broad range of current rates yielded the narrow band of capacity variation depicted in FIG. 5.

When utilized in "rocking-chair" test cells comprising graphite negative electrodes and positive electrodes of higher capacity lithiated intercalation compound, e.g., $Li_{1+x}Mn_2O_4$ ($0<x<1$), the 67:33 1M electrolyte enabled component weight optimization to about 2.8 parts of positive electrode material to 1.0 of negative. The use of this electrolyte further enabled cycling over a range C/15 to C/2 current rates at a stable cell capacity which exceeds by about 22% the capacity obtainable with previously available electrolytes in petroleum coke electrode cells. Considering, in addition, the higher output voltage in such cells comprising graphite electrodes, their overall specific energy is enhanced by about 28% as a result of the use of this new class of electrolytes in accordance with the present invention.

These electrolyte solutions may be employed in practical batteries with any of the various immobilizing means that have found utility in prior cells. In addition to being used to saturate the usual porous separator elements normally disposed between the cell electrodes, these new electrolytes solutions may be included in the form of gelled or thickened compositions or they may be introduced into polymeric matrices as a secondary plasticizer. Such applications and other variants of this type will be apparent to the skilled artisan and are intended to be nonetheless included within the scope of the present invention as recited in the appended claims.

What is claimed is:

1. A method for improving the rapid reversible intercalation of lithium into the electrodes of a secondary battery comprising a lithium source electrode and a carbon electrode, which method comprises:
    a) preparing about a 0.5 to 2M solution of a solute selected from the class consisting of:
       1) LiPF$_6$; and
       2) mixtures of LiPF$_6$ with up to about equal mole parts of LiBF$_4$ dissolved in a mixture consisting of non-aqueous dimethylcarbonate(DMC) and ethylene carbonate (EC) solvents wherein said solvents are present in a weight percent ratio range from about 95 DMC:5 EC to 20 DMC:80 EC;
    b) immobilizing at least a portion of said solution to form an electrolyte body; and
    c) disposing said electrolyte body between and in contact with said electrodes.

2. A method according to claim 1 wherein said solvents are present in a weight ratio range of from about 80 DMC:20 EC to 20 DMC:80 EC.

3. A method according to claim 1 wherein said carbon electrode material is selected from the class consisting of petroleum coke and graphite.

4. A method according to claim 1 wherein said lithium source electrode material is selected from the class consisting of lithium and lithiated metal oxide intercalation compounds.

5. A method according to claim 4 wherein said lithiated intercalation compound has the formula $Li_xMn_2O_4$ wherein $0<x<2$.

6. A method according to claim 5 wherein said lithiated intercalation compound has the formula $Li_{1+x}Mn_2O_4$ wherein $0<x<1$.

7. A method according to claim 6 wherein said carbon electrode material is graphite, the weight ratio of said lithiated intercalation compound to graphite in the respective electrodes is about 2.8:1, and said electrolyte body solution consists about 1M $LiPF_6$ in about 67:33 DMC:EC.

* * * * *